United States Patent Office 2,842,533
Patented July 8, 1958

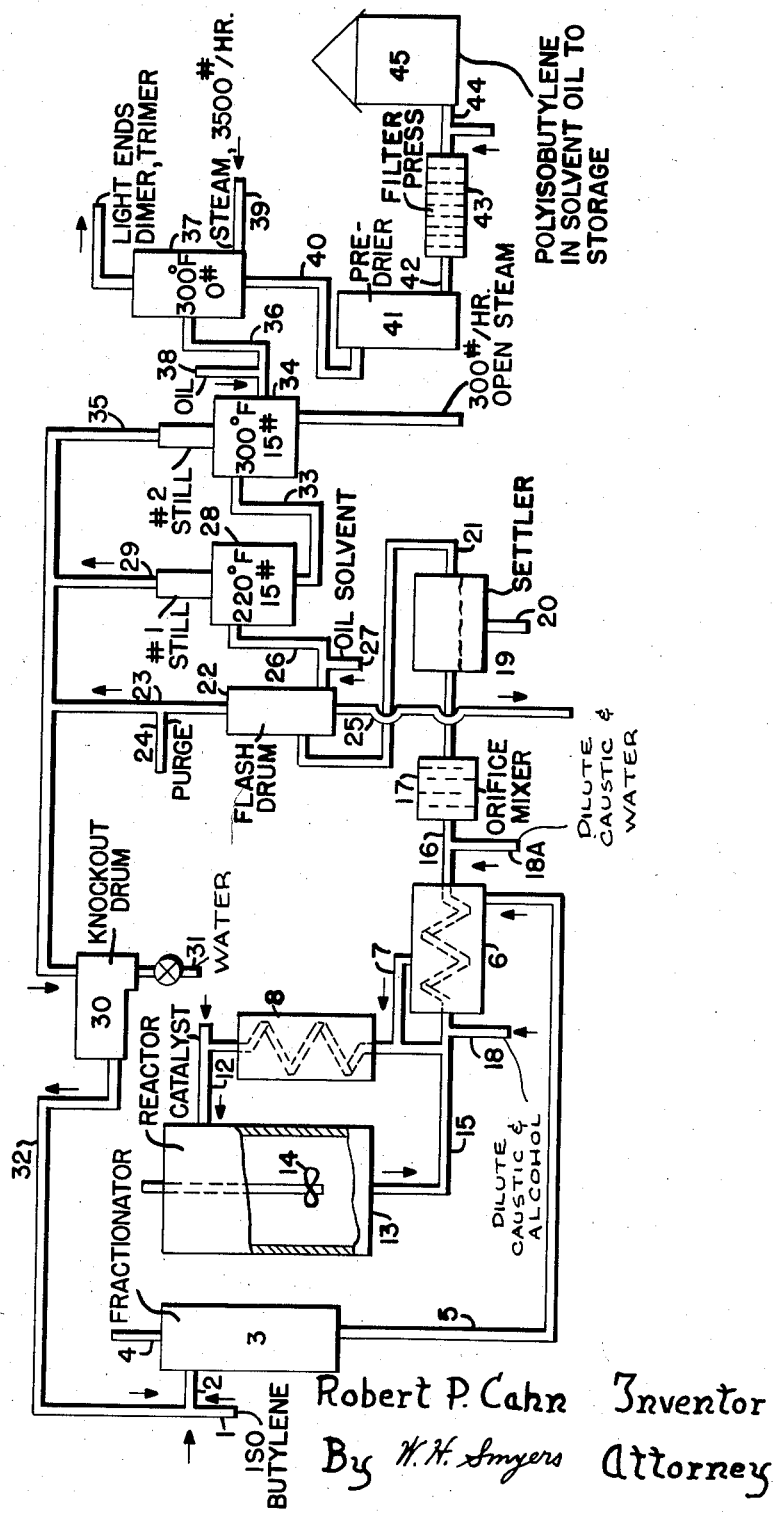

2,842,533

METHOD OF RECYCLING REACTANTS IN POLYBUTENE MANUFACTURE

Robert P. Cahn, Elizabeth, N. J., assignor to Esso Research and Engineering Company, a corporation of Delaware Application December 12, 1955, Serial No. 552,282

7 Claims. (Cl. 260—94.8)

This invention relates to the polymerization of isobutylene and more particularly relates to a method for separating unreacted isobutylene from polymer and recycling it to the reaction zone.

In the manufacture of polyisobutylene by the polymerization of isobutylene with Friedel-Crafts catalysts in a continuous process in the presence of a solvent, it is necessary to strip solvent and unconverted isobutylene from the reaction product and recycle them to the reaction zone. In order to avoid the use of high temperatures in this stripping operation which would result in product degradation, the stripping is usually carried out at relatively low pressure (0–10 p. s. i. g.). However, since the recycle contains a large amount of isobutylene, this requires compression of the recycle in order to liquefy it at ordinary temperatures. This increases the cost of the process. Furthermore, since the isobutylene feed to the reaction contains a small amount of normal butenes which tend to build up in the system and poison the reaction as a result of the recycle, it is necessary to periodically or continuously remove a portion of the recycle in order to reduce the n-butenes to a level where the poisoning effect is not substantially noticeable. When the stripping is carried out in one stage, the recycle stream contains a proportionally large amount of solvent which is lost in the purging operation.

Accordingly, it is one of the objects of this invention to provide means for eliminating the necessity for compressing the recycle isobutylene.

It is another object of this invention to provide means for avoiding the use of high temperatures while at the same time also avoiding the use of compressors.

It is an additional object of the invention to provide means for avoiding the use of excessive amounts of steam in stripping the unreacted isobutylene and solvent from the product.

It is a still further object of the invention to provide means for reducing loss of solvent in purging the normal butenes from the system.

In accordance with the present invention the above objects are accomplished by flashing the reactor products in stages at decreasing pressures and at the same time adding a sufficient amount of a heavy solvent to permit condensation of the unconverted isobutylene in the recycle mixture without the necessity of employing compression.

In accordance with this invention, therefore, isobutylene is polymerized at temperatures between —112° F. and +104° F. in the presence of a suitable catalyst.

Catalysts suitable for the polymerization reaction according to this invention include catalysts of the Friedel-Crafts type, such as boron fluoride, aluminum chloride, aluminum bromide, titanium tetrachloride, uranium chloride, zirconium tetrachloride and the like. The catalyst is added in small quantities, slightly in excess of that needed to initiate the reaction. The reaction may be carried out in any desired manner so long as a large excess catalyst is not used.

The catalyst is best employed in the solid form but it may also be used as a solution in a solvent which forms no complex with the catalyst and is liquid at the reaction temperature. Suitable solvents are the alkyl halides such as methyl and ethyl chlorides and saturated hydrocarbons if the Friedel-Crafts catalyst is soluble therein. When the catalyst is used in the solid form, the amount may vary between 0.01 and 2% by weight of isobutylene in the feed.

When a dissolved catalyst is used, the amount of catalyst added is much smaller since the catalyst is much more efficient. In this case the range is between 0.005 and 1.0% by weight of the isobutylene in the feed.

Suitable solvents for the polymer, in accordance with this invention, include normally liquid alkane hydrocarbons such as pentane, isopentane, hexane, isohexanes, heptane, isoheptanes, octane, isooctanes, etc. and alkyl halides, such as carbon tetrachloride, chloroform, and the corresponding bromine, iodine and fluorine compounds which dissolve the polymer. Other solvents such as carbon disulfide may also be used. Any non-polar material which does not form a complex with the catalyst, which is liquid at the reaction temperature and in which the polymer is soluble, is suitable. Lower molecular weight hydrocarbons such as propane and butane are not suitable because they have a tendency to precipitate the polymer, and also requires the use of compressors in a recycle operation.

These solvents are employed to reduce fouling for a given degree of agitation or to minimize the degree of agitation necessary to prevent fouling. They are also used to prevent the precipitation of the polymer from the reactor solution at temperatures below —50° F. The inert diluent is also used to obtain marked improvements in the molecular weight of the polymer without decreasing the reactor temperature. As high as 70% increase in polymer molecular weight can be obtained over polymer made in non-diluent systems by using 25% of the diluent at the same polymerization temperature.

The diluent or solvent may vary from 25% of the feed up to 95%.

Upon completion of the reaction the catalyst is killed by the addition of water, caustic or alcohol and then flashed in at least two stages with successively reduced pressure in each stage.

In the first stage, carried out at a temperature between 150 and 250° F. and at elevated pressure (15–75 lbs./sq. in. gage), a major portion of the isobutylene is rejected with the vapor. However, sufficient volatile constituents, predominantly solvent, remain in the liquid phase to permit operation at a temperature below the decomposition temperature of the polymer. A suitable relationship between the temperature and pressure in this stage can be found from the following relationship $$T = 2079/(4.877 - \log_{10} P) \pm 10°\ R.$$

where:

$T$ = flash temperature, ° R.
$P$ = absolute pressure in flash drum, p. s. i. a.

An indication of how this formula applies can be seen from the following table:

| P | 4.877— $\log_{10} P$ | 2079/(4.877— $\log_{10} P$) | Suitable T° F. |
|---|---|---|---|
| 30 | 3.40 | 611 | 141–161 |
| 40 | 3.28 | 634 | 164–184 |
| 50 | 3.18 | 654 | 184–204 |
| 60 | 3.10 | 671 | 201–221 |
| 70 | 3.03 | 686 | 216–236 |
| 80 | 2.97 | 700 | 230–250 |
| 90 | 2.92 | 712 | 242–262 |

The overhead from this flashing operation can be easily condensed at the pressure of this flash. The second stage, which may be omitted repeats the same procedure at a pressure between atmospheric and 15 lbs./sq. in. gage. This stage also operates below the decomposition temperature of the product, and since the major portion of the isobutylene has been removed in the first stage, the overhead from the second stage can be condensed at the reduced pressure of this stage. The last stage can be operated at atmospheric pressure, preferably combined with steam stripping in order to remove the last traces of solvent from the polymer without the necessity of coming too close to the decomposition temperature. However, if there is sufficient solvent (at least 60% in the feed) in the recycle it may be possible to condense the total recycle in one condensation system at the pressure of the lowest stage.

The polymer effluent from the first or high pressure stage may be split into two streams. One of these streams is cooled and stored at atmospheric or slightly above atmospheric pressure and can be worked up to prepare pure polymer.

The other stream is mixed with a heavy solvent, such as a lubricating oil and carried through the succeeding stages in solution in this oil to produce a concentrate suitable for addition to lubricating oils to control the viscosity index.

In addition, to obviate the use of compressors, the above described stage flashing prevents excessive loss of solvent when purging n-butenes from the system. Since the overhead from the first stage is considerably less than it would be if all the monomers and solvent were removed in a single flash and since this overhead is proportionally richer in monomers than solvent than occurs in a single stage flashing, purge stream from the first stage overhead results in less solvent loss.

The manner in which the present invention is carried out will be fully understood from the following description when read with reference to the accompanying drawing.

A mixture of hexane and pure isobutylene in line 1 is mixed with recycled isobutylene and hexane in line 32 to give substantially a 70% hexane-30% isobutylene mixture. The recycle isobutylene, however, contains a small amount of water and about 0.02% isopropyl alcohol as contaminants. These are introduced by line 2 into azeotropic distillation tower 3 where the alcohol and water are removed overhead through line 4 as azeotropes with a small amount of the hydrocarbons. Pure, dry isobutylene-hexane mixture is withdrawn through line 5 and passed through heat exchanger 6 and line 7 to cooler 8, where it is cooled to substantially the polymerization temperature, e. g. —40° F. From cooler 8 it is passed by line 11 to catalyst line 12, where it meets finely divided aluminum chloride. The catalyst may be introduced in any known manner as by jet or star feeder or the like. This mixture is then introduced into reaction chamber 13 at a rate of about 100 gallons of feed per hour per pound of catalyst and is agitated by stirrer 14 so that the catalyst is maintained in suspension. Alternately it is possible to add the catalyst directly to the reactor.

Polymer, as it is formed, dissolves in the large excess of hexane present in the reactor and is thus prevented from depositing on the surface of the reaction vessel. The solution of polymer in hexane is withdrawn as a slurry wtih aluminum chloride through line 15 and is contacted with a mixture of dilute caustic and alcohol introduced through line 18 to kill the catalyst. The mixture of polymer and caustic and alcohol is passed through heat exchanger 6, where it cools incoming feed. The heated polymer solution leaves the heat exchanger by line 16 and is passed through orifice mixer 17 where it is thoroughly mixed with the dilute caustic in water introduced through line 18A to completely kill the catalyst. This forms aluminum hydroxide and neutralization salts which are settled out in settler 19, where two layers are formed, an upper layer consisting of a solution of polymer in hexane and a lower layer of dilute caustic containing aluminum hydroxide and neutralization salts. The bottom layer is withdrawn through line 20 and the upper layer is passed by line 21 to flash drum 22, where the lower boiling materials are flashed off through line 23 at a temperature between 150 and 250° F. and a pressure between 15–75 p. s. i., suitably 210° F. and 50 lbs./sq. in. gage. A purge stream is withdrawn through line 24 to prevent normal butenes from building up in the system and poisoning the reaction. A polyisobutylene product containing unstripped hexane and small amounts of isobutylene and having a molecular weight in the range of 10,000 to 20,000 or even up to 50,000 is withdrawn from the bottom of flash drum 22 through line 25.

A solution of isobutylene polymer in hexane is withdrawn from flash drum 22 by line 26. A lubricating oil such as Essolube 20 is added to this stream through line 27 as a heavy carrier oil for the polymer. This mixture is passed to still 28, where it is distilled at a temperature to about 200o–300° F.; suitably 210° F., under a pressure of 15 lbs./sq. in. gage. A stream containing approximately 15% isobutylene and 85% hexane is withdrawn from the still through line 29, combined with the overhead from flash drum 22 cooled, and passed into knockout drum 30, where any water present in this stream is settled out and removed through line 31. The substantially dry mixture of isobutylene and hexane is recycled to distillation tower 3 by line 32.

Bottoms from still 28 are passed through line 33 to a second still 34 operating at about 300° F. under a pressure of 15 lbs./sq. in. gage. This still removes the last traces of isobutylene and the remainder of the hexane from the solution of polymer in oil. The overhead withdrawn by line 35 from the top of still 34 contains about 7% isobutylene, 85% hexane, and the remainder water and other minor constituents and is combined with the recycle from line 29. Bottoms from still 34 are withdrawn by line 36 and passed to a third still 37. Additional oil may be added by line 38, if desired. Still 37 is operated at about atmospheric pressure and about 300° F. to give an overhead stream containing any dimer and trimer present. Dry steam is admitted through line 39 to the base of still 37 to facilitate stripping off the light ends. Bottoms from still 37 are passed by line 40 to air drier 41 to remove any remaining moisture. The dried oil-polymer solution is then passed by line 42 to filter press 43 to remove any remaining aluminum hydroxide and neutalization salts. The finished solution of polybutene in oil is then passed by line 44 to storage tank 45.

This application is a continuation-in-part of application Serial No. 328,481, filed December 29, 1952, and now abandoned.

The nature of the present invention having been thus fully set forth and illustrated, what is claimed as new and useful and desired to be secured by Letters Patent is:

1. In a process for the preparation of polyisobutylene wherein isobutylene is contacted at —112° to +104° F. with a Friedel-Crafts catalyst in the presence of 25–95% of an inert non-polar solvent for the polymer based on total feed, said solvent being one which does not form a complex with the catalyst, which is liquid at the reaction temperature and in which the polymer is soluble, the method of separating the polybutene product from unreacted isobutylene and solvent which comprises introducing the reaction product into a first separating zone at 150°–250° F. and 15–75 lbs./sq. in., withdrawing unreacted isobutylene and some solvent overhead from said first zone, withdrawing polyisobutylene solution in solvent from the bottom of said first zone, heating the withdrawn solution in a second separating zone at 200°–300° F. and 15 lbs./sq. in. to remove all of the remaining isobutylene and most of the solvent, cooling, condensing and recycling the isobutylene and solvent from the first and second zones to the reaction zone and heating the remaining polyisobutylene at about 300° F. and atmospheric pressure in a third zone to remove all traces of solvent and light products.

2. Process according to claim 1 in which the catalyst is aluminum chloride.

3. Process according to claim 2 in which the solvent is hexane.

4. Process according to claim 3 in which a high boiling petroleum oil is mixed with at least part of the bottoms product from the first zone as a fluxing medium.

5. Process according to claim 4 in which the oil is lubricating oil.

6. Process according to claim 1 in which the amount of solvent is between 25 and 70% and in which the recycle from the first and second zones are cooled and condensed separately.

7. Process according to claim 1 in which the amount of solvent is between 60 and 95% and in which the recycle is all condensed together.

References Cited in the file of this patent

UNITED STATES PATENTS

| | | |
|---|---|---|
| 2,389,240 | Reid | Nov. 20, 1945 |
| 2,409,247 | Brooks et al. | Oct. 15, 1946 |